(12) United States Patent
Grot et al.

(10) Patent No.: US 6,733,914 B1
(45) Date of Patent: May 11, 2004

(54) FUEL CELL MEMBRANES

(75) Inventors: Walther Gustav Grot, Chadds Ford, PA (US); Stephen Andreas Grot, Newark, DE (US)

(73) Assignee: Ion Power, Inc., Bear, DE (US)

( * ) Notice: Subject to any disclaimer, the term of this patent is extended or adjusted under 35 U.S.C. 154(b) by 235 days.

(21) Appl. No.: 09/789,160

(22) Filed: Feb. 20, 2001

Related U.S. Application Data

(60) Provisional application No. 60/183,436, filed on Feb. 18, 2000.

(51) Int. Cl.$^7$ ............... H01M 8/10; C08F 14/18; C08J 5/22
(52) U.S. Cl. ............... 429/33; 429/41; 521/28; 526/243
(58) Field of Search ............... 429/30, 33, 41; 521/27, 28, 30; 526/243

(56) References Cited

U.S. PATENT DOCUMENTS

| | | | |
|---|---|---|---|
| 3,784,399 A | | 1/1974 | Grot |
| 3,849,243 A | * | 11/1974 | Grot ............... 442/164 |
| 3,902,947 A | * | 9/1975 | Grot ............... 156/213 |
| 3,969,285 A | * | 7/1976 | Grot ............... 521/32 |
| 4,030,988 A | * | 6/1977 | Grot ............... 205/520 |
| 4,168,216 A | * | 9/1979 | Burkhardt et al. ... 205/521 |
| 4,876,115 A | | 10/1989 | Raistrick |
| 5,242,764 A | | 9/1993 | Dhar |
| 5,302,269 A | * | 4/1994 | Eisman et al. ...... 204/252 |
| 5,318,863 A | | 6/1994 | Dhar |
| 5,521,020 A | | 5/1996 | Dhar |
| 5,547,911 A | * | 8/1996 | Grot ............... 502/101 |

OTHER PUBLICATIONS

S. Yan, B. Sompalli, M. Scozzafava, H.A. Gasteiger, "Kinetic & Transport Losses in PEMPC's", Mar. 26, 2001, 2 pgs.
T.E. Springer, M.S. Wilson, S. Gottesfeld, "Modeling and Experimental Diagnostics in Polymer Electolyte Fuel Cells", J. Electrochem, Soc., vol. 140 No. 12, Dec. 1993, 3513.

* cited by examiner

*Primary Examiner*—Stephen Kalafut
*Assistant Examiner*—Tracy Dove
(74) *Attorney, Agent, or Firm*—Huntley & Associates, LLC.

(57) ABSTRACT

A perfluorinated ion exchange membrane useful for membrane electrode assemblies and fuel cells and having improved ionic conductivity and water absorption characteristics.

9 Claims, 1 Drawing Sheet

FUEL CELL MEMBRANES

CROSS-REFERENCE TO RELATED APPLICATION

This application is based on Provisional Application No. 60/183,436 filed Feb. 18, 2000.

BACKGROUND OF THE INVENTION

This invention relates to perfluorinated ion exchange membranes for use in electrochemical devices, in particular fuel cells using either hydrogen gas or methanol as a fuel. Such membranes were previously made from extruded films of a precursor polymer, containing sulfonyl halide functional groups, by contacting the extruded films with a solution of alkali hydroxide, such as sodium or potassium hydroxide, followed by acid exchange with a strong acid such as hydrochloric or nitric acid. The precursor polymer is commonly made by the copolymerisation of tetrafluoroethylene with a comonomer containing a polymerizable vinyl group and one or more sulfonyl fluoride groups. Examples of such precursor polymers are those having the general formula:

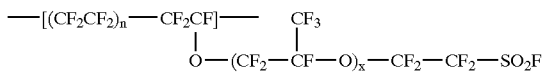

wherein X is from 0 to 2. Products made from of these precursor polymers are commercially available under the tradenames NAFION AND FLEMION, from DuPont and Asahi, respectively. Other precursor polymers which have been used in the past are those prepared from short branch polymers of the same formula, but wherein X=0, having a repeating unit of the general formula:

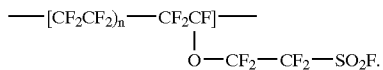

For the purposes of the present invention, short branch polymers are preferred.

The composition of such polymers can be described in terms of the comonomer ratio n, or, more commonly, in terms of the equivalent weight (EW) of the final polymer in the sulfonic acid form, that is, after the acid exchange described above. Previously known fuel cell membranes, such as those described above, can exhibit excellent performance. However, continuing effort has been directed to achieving optimum EW from such membranes. From the standpoint of maximum ionic conductivity, it is desirable to choose the lowest possible EW, preferably lower than 900. However, when methanol is used as a fuel, membranes made of such low EW polymers exhibit excessive crossover of methanol. When either hydrogen or methanol is used as a fuel, the membranes exhibit excessive water absorption and resulting swelling and loss of mechanical strength under high humidity conditions. Accordingly, a continuing need exists for such membranes which exhibit minimum cross over of methanol, and more constant water uptake under variable humidity conditions than membranes of the prior art.

SUMMARY OF THE INVENTION

The present invention provides ion exchange membranes which exhibit excellent ionic conductivity and more uniform water absorption, particularly when used in fuel cells.

Specifically, the instant invention provides, in a perfluorinated polymeric ion exchange membrane comparing $SO_2F$ moieties, the improvement wherein about from 0.1 to 30 wt % of the $SO_2F$ moieties are converted to $SO_2NH_2$ moieties. The invention further provides membrane electrode assemblies and fuel cells incorporating these membranes.

DETAILED DESCRIPTION OF THE INVENTION

Figure 1:
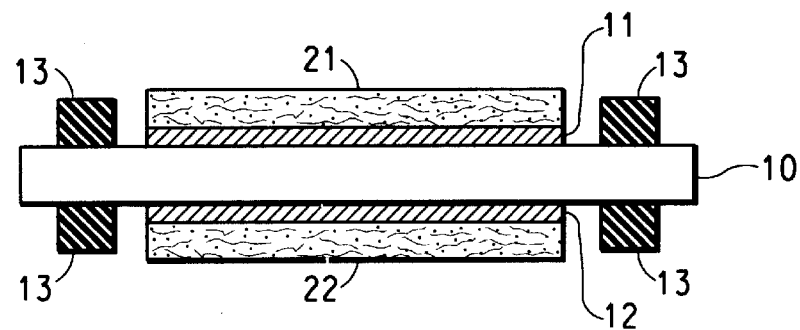
FIG. 1 is a schematic, cross-sectional illustration of a membrane electrode assembly of the present invention.

The perfluorinated ion exchange membranes of the present invention are of the general type described in Connolly et al., U.S. Pat. No. 3,282,875, which is hereby incorporated by reference. In accordance with the present invention, the treatment with an alkali metal hydroxide used in the prior art is replaced by treatment of the precursor film with an aqueous solution of ammonia (i.e., ammonium hydroxide), preferably also containing a small amount of alkali metal hydroxide or strong organic base, such as a trialkyl amine. What is meant with "a small amount" is an amount sufficient to convert substantially all acidic moieties (i.e., anions) created in the reaction of the sulfonyl halide groups of the precursor polymer to their strong base salts.

It is known that perfluorinated precursor polymers containing sulfonyl fluoride groups can be converted to polymers containing sulfonamide groups by treatment with anhydrous ammonia. This is described in Grot, U.S. Pat. No. 3,784,399, hereby incorporated by reference. Such perfluorinated sulfonamide groups are weak acids and are capable of forming stable salts with strong inorganic or organic bases mentioned above. If an aqueous solution of ammonia, optionally containing a small amount of strong base, is used to treat the precursor polymer, the sulfonyl halide groups are converted to a mixture of the salts of sulfonic acid and sulfonamide groups. The ratio of the two reaction products can be controlled by the concentration of the aqueous ammonia and the amount of strong base present. The reactions described above create as a sharply defined boundary in the polymer. This boundary advances through the thickness of the polymer as the reaction progresses. Accordingly, before the reaction is complete, there is a sharply defined boundary between the outer layer of the film, which is almost completely reacted, and an inner layer, which shows little, if any reaction. What is meant with "almost completely reacted" is that this outer layer contains a few unreacted sulfonyl halide groups, particularly if the reaction is carried out below 50° C. and especially at room temperature or below. This is desirable if the reaction is followed by the optional heat treatment described below. Because the lower temperatures also require much longer reaction times for a given penetration of thickness, lower reaction temperatures will result in some diffusion of ammonia into the inner layer, causing the formation of a small amount of sulfonamide groups in this otherwise unreacted layer. This again is desirable, if the subsequent heat treatment is to be used.

In general, the above-described reaction is not used for the entire thickness of the precursor film, but certain layers will be subjected to the alkali metal hydroxide treatment previously used in the art. Preferably, the outermost surface of the membrane contains only the sulfonic acid groups, as found in films of the prior art. This permits these surfaces to be easily and effectively coated with a catalyst ink composition containing the same prior art polymer. Bonding between identical polymers will be better than between different polymers, particularly if one is crosslinked. The thickness of this outermost layer needs to be only about 1 micron in thickness, but can range from about 1 to about 20 microns. Underneath one or both of these surface layers will be a polymer layer made according to the present invention.

To minimize methanol crossover, it is preferred that these subsurface layers, consisting of ammonia-modified polymer of the present invention, have a thickness about 10 microns. For the purpose of minimizing variations in the degree of hydration, it is preferred that most or substantially all of the sulfonyl halide moieties below the surface layer be treated to convert the sulfonyl halide to the ammonia modified polymer of the present invention. However, if the optional heat treatment is used, it would be most desirable to have a layer of unreacted precursor polymer adjacent to each layer treated according to this invention. Accordingly, the following reaction sequence is preferably used: (1) A surface hydrolysis according to the prior art, using sodium or potassium hydroxide on both surfaces. (2) On one or both surfaces a treatment with aqueous ammonia, optionally containing a strong base, according to the present invention. (3) An optional heat treatment. (4) Total hydrolysis according to the prior art using sodium or potassium hydroxide, to completely convert any unreacted sulfonyl halide groups to sulfonate groups. (5) An acid exchange according to the prior art, using hydrochloric or nitric acid, to convert all salt groups into the corresponding free acids. (6) A final washing and drying step.

The time required for the various steps will depend on the concentration and temperature of the reagents used and the depth of the reaction desired. Using a 10 % solution of sodium hydroxide in water, the first step will require between 5 and 100 minutes at 50° C. and step (4) will require several hours at 70° C. Using 27 % aqueous ammonia at 18° C., step (2) will require between 10 and 300 minutes.

The thickness of the reacted layers can be determined by slicing or microtoming a cross section of the sample followed by staining with a cationic dye such as methylene blue. In the alternative, infra red analysis can be used to follow the decrease and eventual disappearance of the two peaks at 3.7 and 6.8 microns representing the sulfonyl fluoride group.

The films of the present invention can be, and preferably are, heated to further improve the performance characteristics, especially the swelling associated with water absorption. The films can be heat treated by heating to a temperature of about from 190 to 250° C. for about from 10 to 60 minutes. While the changes brought about by heat treatment are not fully understood, it is believed that during this treatment a cross linking reaction between the strong base salt of the sulfonamide and residual sulfonyl halide groups occurs, and that this provides sulfonimide crosslinking groups of the general formula:

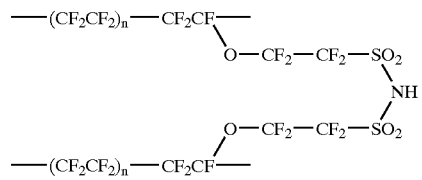

This moiety is a proton conductor with limited hydration ability, and accordingly will tend to limit the water absorption of the membrane in use.

The membranes of the present invention can be used in a variety of applications, including, for example, membrane electrode assemblies and fuel cells. Representative of the membrane electrode assemblies and fuel cells in which these membranes can be used are those described in Steck et al., U.S. Pat. No. 5,464,700 and Dahr, U.S. Pat. No. 5,318,863, respectively, both of which are hereby incorporated by reference. A membrane electrode assembly typically comprises opposing planar cathodes and anode, and an ion exchange membrane interposed between the two, with appropriate gasketting material. A fuel cell typically adds to this combination a fuel distribution member supplying fuel to one electrode and an oxidant distribution member for supplying oxidant to the other.

For use in such applications, it has been found particularly satisfactory to use a laminar construction comprising a core of conventional perfluorinated ion exchange membrane, a layer of the membranes of the present invention on each surface of the core, and outer surfaces of conventional perfluorinated ion exchange membranes.

The present invention is further illustrated in the Figures, in which like reference numbers indicate like components in the two figures.

A typical membrane electrode assembly is schematically illustrated in FIG. 1, in which a membrane 10 is coated on both sides with catalyst 11 and 12, which are also a cathode and an anode, respectively. The assembly also comprises perimeter sealing material 13, which aids in the combination of the assembly into a fuel cell. Gas diffusion medi 21 and 22 are positioned on the electrodes. The gas diffusion media can be prepared, for example, from carbon cloth or carbon paper.

Figure 2:
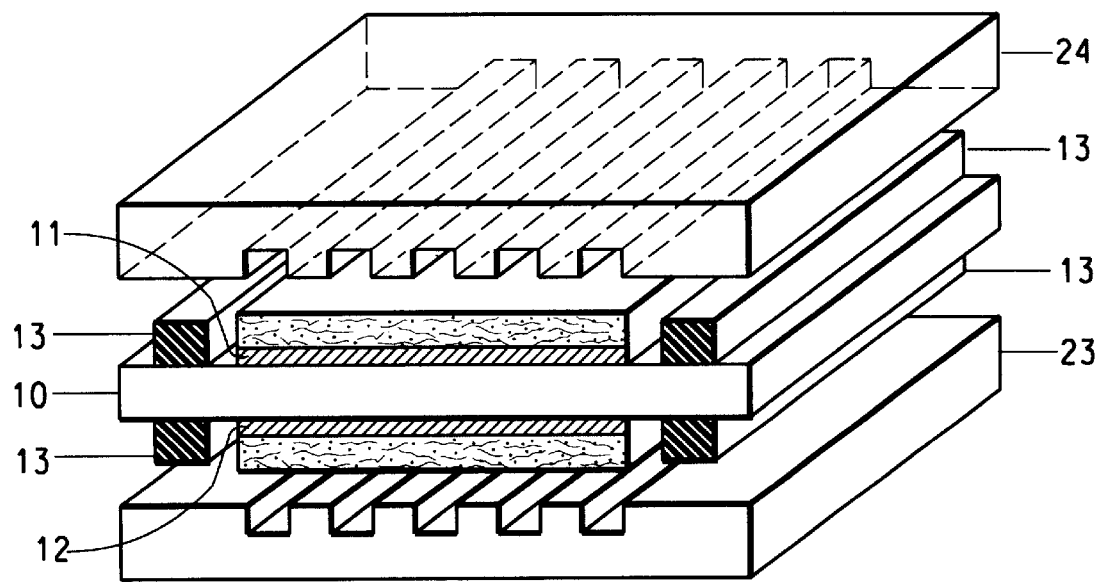
FIG. 2 is a schematic, cross-sectional illustration of a fuel cell of the present invention.

A fuel cell is schematically illustrated in FIG. 2, in which the membrane electrode assembly is between, and operatively connected to, fuel distribution members 23 and 24. The fuel distribution members contain flow channels for the transport of reactant fluids to and from the membrane electrode assembly shown in FIG. 1. These distributor plates can be stacked one on top of another with membrane electrode assemblies interspersed to allow the voltage on each cell to accumulate and thus producing a more useful voltage from the fuel cell, this is commonly referred to as a fuel cell stack

EXAMPLES

The present invention is further illustrated by the following specific Examples, in which parts and percentages are by weight unless otherwise indicated.

Examples 1 and 2 and Control Example A

A 7 mil thick film of 1100 EW NAFION precursor film made by DuPont (coded NAFION 117F) was chemically modified according to the current invention throughout substantially its entire thickness. In Examples 1 and 2, the film was immersed in a solution of 500 mg potassium hydroxide in 50 ml of 28 % aqueous ammonia at 10° C. for 3 hours. The film was then blotted and dried and heated for 30 minutes to 200° C. The film in Example 1 was then treated a second time with the same solution for 50 hours and again blotted, dried and heated for 30 minutes to 200° C. In Example 2, a film was treated the same way except that both heat treatments were for 40 minutes at 240° C. The samples for both Examples 1 and 2 were then heated in a 10 % solution of potassium hydroxide for 2 hours to 80° C. in order to hydrolyze any unreacted sulfonyl fluoride groups. A control sample was hydrolyzed according to the prior art by heating in a 10 % solution of potassium hydroxide for 3 hours to 80° C. Total hydrolysis of all 3 samples was then confirmed by the disappearance of the 6.8-micron peak in the infrared spectrum. In Control Example A, a sample was then also heated for 1 hour to 200° C. All three samples were then acid exchanged using a 10 % solution of hydrochloric acid, followed by rinsing with water and drying. Strips of 47 mm length were cut from the 3 samples and their swelling behavior compared with that of a 47 mm long strip of NAFION 117, which is the hydrogen ion form made from the same NAFION 117F precursor film according to the prior art.

The four samples were swollen successively under increasingly drastic conditions and their length and thickness measured. The results are shown in the following table:

| Conditions | Treatment @ 200 Mils | mm | Treatment @ 240° C. Mils | mm | K+ N117 Heated Mils | mm | NAFION N117 Mils | mm |
|---|---|---|---|---|---|---|---|---|
| Air Dry | 7.6 | 47 | 7.3 | 47 | 7.5 | 47 | 7.6 | 47 |
| Methanol @ 20 | 9.2 | 59 | 8.7 | 55 | 10.6 | 71 | 10.3 | 70 |
| Methanol @ 50 | 9.4 | 60 | 9.1 | 56 | 11.9 | 80 | 1109 | 77 |
| IPA/water @ 50 C. | 10 | 63 | 9.4 | 57 | 16.5 | 108 | 14.5 | 103 |
| IPA/water @ 90 C. | 10.2 | 63 | 9.5 | 57 | 17.9 | 119 | 17 | 118 |

The results indicate that the two samples made according to the present invention showed decreased swelling compared to the prior art sample or to a prior art sample heated in the potassium ion form to 200° C. In particular, the samples showed very little swelling after about 20 % or 30 % (respectively) expansion while the 2 control samples continued to expand and would eventually at even higher temperatures convert into liquid compositions, as shown in U.S. Pat. Nos. 4,433,082 and 4,453,991. This clearly indicates that crosslinking had occurred in the two samples treated according to the present invention.

Example 3

A layered structure was prepared by immersing a 6×9 inch sheet of NAFION 117F precursor film in a 10 % solution of sodium hydroxide in water for 3 hours at about 60° C. A sample taken from the edge of the film was evaluated by slicing and staining. This indicated that conventional hydrolysis had occurred on both surfaces to a depth of about 2 mils each. Infrared analysis taken in the central area of the sheet confirmed that about half of the original sulfonyl fluoride groups remained unreacted.

The sheet was then immersed for 14 hours at 18° C. in a solution of 1 g potassium hydroxide in 28 % ammonium hydroxide. Slicing and staining at this point indicated complete reaction through the entire thickness. Infrared analysis, however, indicated that a small fraction of the sulfonyl fluoride groups had remained unreacted. The sheet was dried and heated to 220° C. for 20 minutes. Infrared analysis indicated that the amount of unreacted sulfonyl fluoride groups had decreased. After a second heating for 25 minutes to 230° C., the IR peak representing unreacted sulfonyl fluoride had almost disappeared. The sample was now subjected to a final hydrolysis for 2 hours in 10 % sodium hydroxide at 70° C., followed by acid exchange, rinsing and drying. This sample was tested in a direct methanol fuel cell. The results of the fuel cell testing showed a higher open circuit voltage indicative of lower methanol crossover, as well as higher power density under load.

Example 4

A fuel cell was prepared from mil thick film of 800 EW short branch precursor film supplied by DuPont. The film had the general formula

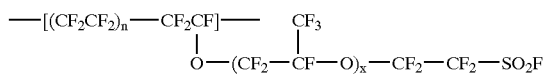

wherein X=0. The film was chemically modified according to the current invention throughout substantially its entire thickness by first immersing the film in a solution of 500 mg potassium hydroxide in 50 ml of 28 % aqueous ammonia at 10° C. for 30 minutes. The film was then blotted and dried and heated for 30 minutes to 200° C. The film was then treated a second time with the same solution for 5 hours and again blotted, dried and heated for 30 minutes to 200° C. The sample was then heated in a 10 % solution of potassium hydroxide for 2 hours to 80° C. in order to hydrolyze any unreacted sulfonyl fluoride groups. A control sample was hydrolyzed according to the prior art by heating in a 10 % solution of potassium hydroxide for 3 hours to 80° C. Total hydrolysis of both samples was then confirmed by the disappearance of the 6.8 micron peak in the infrared spectrum. The control sample was then also heated for 1 hour to 200° C. Both samples were then acid exchanged using a 10 % solution of hydrochloric acid, followed by rinsing with water and drying. Strips of 47 mm length were cut from the samples and their swelling behavior in water at room temperature compared. The film treated according to the present invention expanded to 57 mm while the control sample expanded to 74 mm.

We claim:

1. In a perfluorinated polymeric ion exchange membrane comprising $SO_2F$ moieties and having a first and a second surface, the improvement wherein about from 0.1 to 30 wt % of the $SO_2F$ moieties on at least the first and second surfaces are converted to $SO_2NH_2$ moieties, and the remaining $SO_2F$ moieties are almost completely converted to at least one moiety of the general formula $SO_3X$, wherein X is at least one selected from H, K, Na and $NH_4$, the ion exchange membrane being free from a continuous layer having a majority of the $SO_2F$ moieties converted to $SO_2NH_2$.

2. An ion exchange membrane of claim 1 wherein about from 1 to 10 wt % of the $SO_2F$ moieties are converted to $SO_2NH_2$ moieties.

3. An ion membrane comprising a core of a membrane of claim 1 and at least one outer layer of having a thickness of about from 1 to 20 $\mu$ and consisting essentially of ion exchange membrane of fluorinated polymer having pendant side chains containing sulfonyl groups which are attached to carbon atoms which have at least one fluorine atom attached thereto, substantially all of which sulfonyl groups are in the form of $SO_3H$.

4. An ion exchange membrane of claim 3 wherein the sulfonamide groups are crosslinked to provide a moiety of the general. formula:

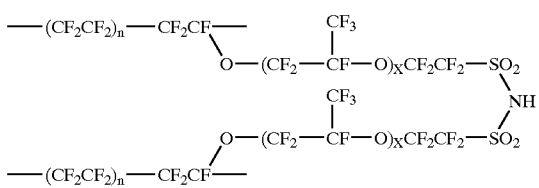

wherein X is from 0 to 2 and n is from 2 to 8.

5. In a membrane electrode assembly comprising at least one planar cathode and at least one opposing planar anode, and an ion exchange membrane interposed therebetween, the improvement wherein the ion exchange is a membrane of claim 1.

6. In a fuel cell comprising at least one electrode pair comprising a planar cathode and an opposing planar anode, an ion exchange membrane interposed therebetween, a fuel distribution member supplying fuel to one electrode and an oxidant distribution member for supplying oxidant to the other, the improvement wherein the ion exchange membrane is a membrane of claim 1.

7. A laminar ion exchange membrane comprising a core of perfluorinated ion exchange polymer containing sulfonic acid moieties, and a layer of polymer of claim 1 bonded to each surface of the core.

8. A laminar ion exchange membrane of claim 7 wherein each polymer layer bonded to the core has a thickness of about from 5 to 30 microns.

9. A laminar ion exchange membrane of claim 7 further comprising an outer layer of perfluorinated ion exchange polymer containing sulfonic acid moieties bonded to each outer surface of the laminate.

* * * * *

UNITED STATES PATENT AND TRADEMARK OFFICE
CERTIFICATE OF CORRECTION

PATENT NO. : 6,733,914 B1  Page 1 of 2
DATED : May 11, 2004
INVENTOR(S) : Grot et al.

It is certified that error appears in the above-identified patent and that said Letters Patent is hereby corrected as shown below:

Column 1,
Line 67, change "…orinated polymeric ion exchange membrane comparing…" to read:
-- …orinated polymeric ion exchange membrane comprisinng… --

Column 6,
Lines 57-67, change "3. An ion exchange membrane comprising a core of a membrane of Claim 1 and at least one outer layer of having a thickness of about from 1 to 20 $\mu$ and consisting essentially of ion exchange membrane of fluorinated polymer having pendant side chains containing sulfonyl groups which have at least one fluorine atom attached thereto, substantially all of which are in the form of $-SO_2H$." to read:
-- 3. An ion exchange membrane comprising a core of a membrane of Claim 1 and at least one outer layer of having a thickness of about from 1 to 20 $\mu$ and consisting essentially of ion exchange membrane of fluorinated polymer having pendant side chains containing sulfonyl groups which have at least one fluorine atom attached thereto, substantially all of which are in form of $-SO_3H$. --

Column 6, line 65 through Column 7, line 10,
Change: "4. An ion exchange membrane of Claim 5 wherein the sulfonamide groups are crosslinked to provide a moiety of the general. formula:

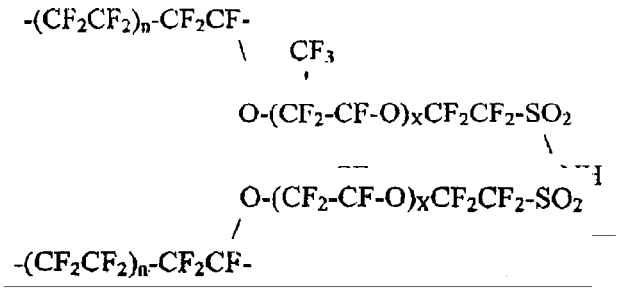

wherin X is from 0 to 2 and n is from 2 to 8." to read

UNITED STATES PATENT AND TRADEMARK OFFICE
CERTIFICATE OF CORRECTION

PATENT NO.   : 6,733,914 B1
DATED        : May 11, 2004
INVENTOR(S)  : Grot et al.

It is certified that error appears in the above-identified patent and that said Letters Patent is hereby corrected as shown below:

Column 6 (cont'd),
-- 4. An ion exchange membrane of Claim 5 wherein the sulfonamide groups are crosslinked to provide a moiety of the general formula:

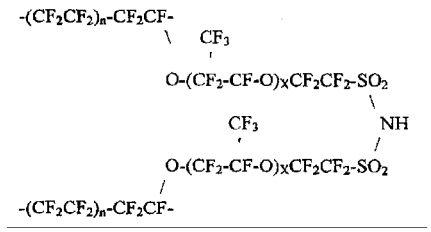

wherein X is from 0 to 2 and n is from 2 to 8. --

Signed and Sealed this

Twenty-seventh Day of July, 2004

JON W. DUDAS
*Acting Director of the United States Patent and Trademark Office*